April 28, 1953 K. B. ANDERSON 2,636,822
DEVICE FOR SUPPORTING A CAMERA OR SIMILAR INSTRUMENT
Filed March 8, 1950 2 SHEETS—SHEET 1
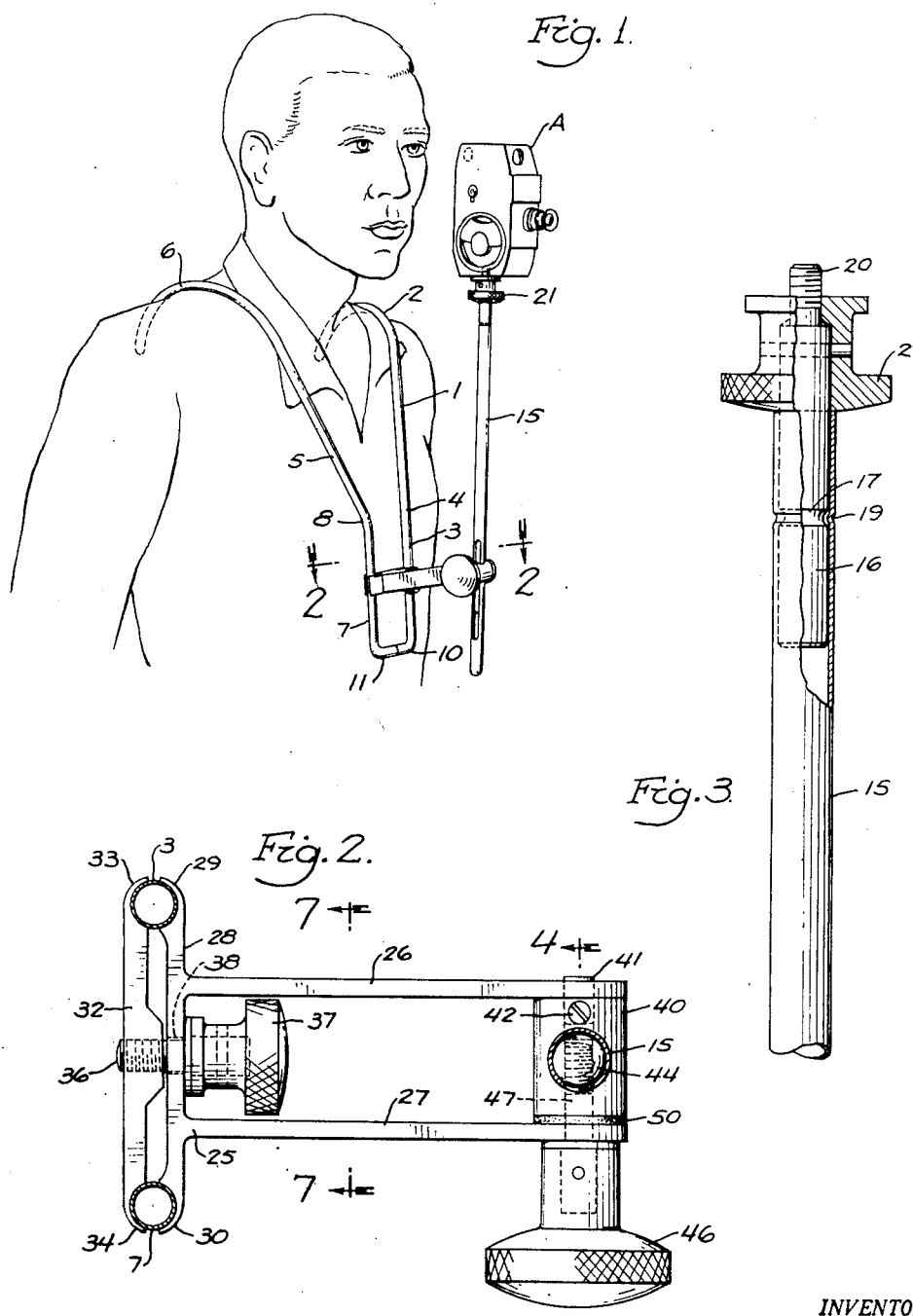
INVENTOR.
Kathryn B. Anderson
BY
Barnes Kisselle Laughlin & Raisch
Attorneys.

April 28, 1953 K. B. ANDERSON 2,636,822
DEVICE FOR SUPPORTING A CAMERA OR SIMILAR INSTRUMENT
Filed March 8, 1950 2 SHEETS—SHEET 2

INVENTOR.
Kathryn B. Anderson
BY
Barnes Kisselle Laughlin & Raisch
Attorneys.

Patented Apr. 28, 1953

2,636,822

UNITED STATES PATENT OFFICE 2,636,822

DEVICE FOR SUPPORTING A CAMERA OR SIMILAR INSTRUMENT

Kathryn B. Anderson, Grosse Pointe Farms, Mich.

Application March 8, 1950, Serial No. 148,363

5 Claims. (Cl. 95—86)

This invention relates to a device for use with a camera or other instrument used in the line of sight and has to do especially with a device by which the user may support the instrument from the person independently of holding the instrument with the hands.

The device is believed to be especially useful with small cameras for taking motion pictures although it may be useful with cameras for taking still pictures and with binoculars or the like. The small camera referred to is a camera for personal use which is usually carried about by people interested in taking motion pictures.

In the taking of motion pictures the camera is usually held at eye level so that the user may sight through the finder or other mechanism thereon, and the camera should be held quite steadily and solidly. Cameras are ofttimes used at different spectacles and events and sometimes after the user has placed himself in the desired position, there may be considerable lapse of time or several sequential lapses of time before conditions are just right for the taking of the pictures. This ofttimes becomes tiresome in holding the camera in the elevated position of the line of sight or thereabouts. Furthermore, the resultant fatigue tends to make the user hold the camera less steady.

The object of the present invention is to provide an improved device which may be quickly and easily engaged with the body of the user for holding the camera in a correct or approximately correct position thus freeing the hands of the user and supporting the camera in a stable manner.

A device constructed in accordance with the invention is disclosed in the accompanying drawings:

Fig. 1 is a general view illustrating a camera supported by the device with the device supported and carried by the body of the user.

Fig. 2 is an enlarged cross sectional view taken on line 2—2 of Fig. 1 showing certain adjustment features.

Fig. 3 is an enlarged view illustrating the camera attaching structure.

Figure 6:
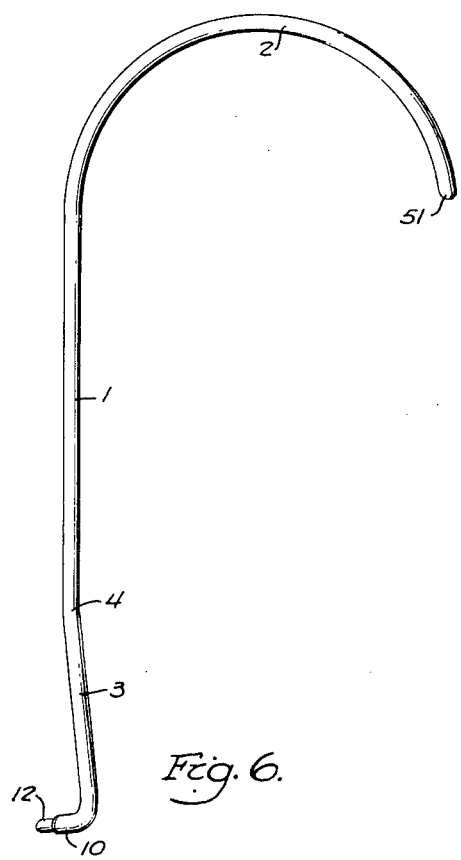
Fig. 6 is a perspective view of one of the supporting or hanger members.
Figure 5:
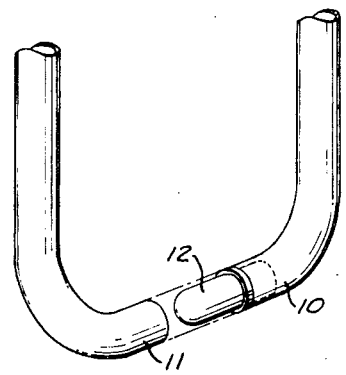
Fig. 5 is an enlarged perspective view showing a structural feature which permits of collapsing the device for transporting the same.
Figure 7:
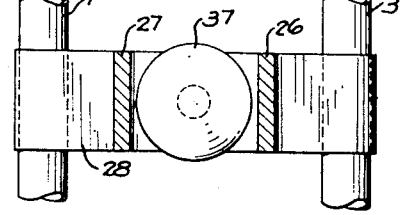
Fig. 7 is a view in section taken substantially on line 7—7 of Fig. 4.

It is the view of the invention to provide a convenient and simple arrangement for holding a camera, as above pointed out, and which embodies a few simple elements so that the device can be easily carried and transported. To this end, two supporting members are provided which are in the nature of hangers, each for engaging over a shoulder of the user. One support, shown in Fig. 6, has a body portion 1 and a relatively large hook portion 2 at one end. The hook portion 2 may be regarded as the upper end. The body portion is arranged to extend angularly from the shoulder to the front and center portion of the body of the user. A lower portion is indicated at 3, there being a bend line 4 between the body portion and the lower portion 3.

There is a second hanger of similar construction having a body portion 5, an upper hook portion 6, a lower portion 7 with a bend line 8. The two hangers are practically identical except that one is for the right side and one is for the left side. The extreme lower ends are fashioned to extend inwardly toward each other as at 10 and 11. The two hangers are preferably made of tubing. This gives adequate strength and at the same time provides for the desired lightness of weight. One extreme end portion, such as the portion 10, is provided with a stud 12 relatively permanently attached thereto and which is arranged to telescope within the end portion of the other hanger, namely, the portion 11. Preferably the member 12 telescopes within the member 11 with some friction. Thus, it will be observed that the two hangers may be separated from each other and thus compactly arranged for carrying and when they are assembled as shown in Fig. 1, the two portions 3 and 7 are substantially parallel with each other.

A suitable camera is illustrated at A and it is to be directly supported by a supporting post 15. This post is also preferably of tubular construction. Cameras are usually equipped with an internally threaded recess by which the same may be placed upon a tripod or other support and accordingly the post is equipped with a screw threaded member for cooperation with the threaded recess. To this end, a stud 16 provided with a groove 17 is placed within the upper end of the post 15 and to hold the stud in assembly with the post the metal of the post is displaced into the groove, as shown at 19. The post is provided with a slot 18 which extends lengthwise of the post. The arrangement is such that while the stud is held within the post it is rotatable therein. The exposed end of the stud is screw threaded, as shown at 20, and it is euipped with a knob or turning device as shown at 21. The camera is applied to the device by turning the knob and thus causing the screw threaded end to engage in the threaded recess of the camera. After the camera has been tightened on its screw threads, it may be turned on the axis of the stud 16.

A bracket supports the post at a distance spaced from the person, the bracket having means for adjustably engaging the parallel portions 3 and 7 of the hangers. Such a bracket is shown at 25 in Fig. 2 as having two spaced arms 26 and 27 and a base 28 with recessed end portions 29 and 30 for engaging the portions 3 and 7 of the hangers. A clamp 32 with recessed ends 33 and 34 for engaging the hangers is connected to the bracket as by means of a screw threaded member 36 having a turning knob 37, the member being rotatably positioned in an aperture 38 in the base. Thus, it will be seen by tightening the knob the parallel portions 3 and 7 of the hangers are tightly gripped and by loosening the knob the bracket may be vertically adjusted relative to the parallel portions and may be entirely disassembled therefrom.

Figure 4:
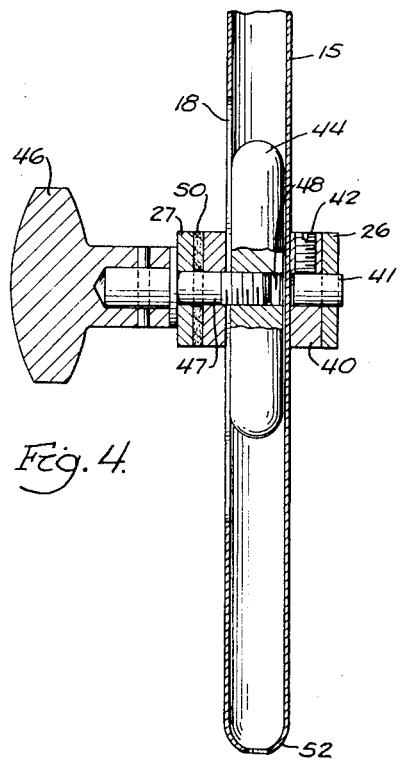
Fig. 4 is a sectional view taken substantially on line 4—4 of Fig. 2 showing a vertical adjustment.

The post 15 is mounted for rocking adjustment and for lengthwise adjustment at the outer ends of the arms 26 and 27, as indicated in Figs. 2 and 4. There is a hub member 40 rotatably positioned between the arms 26 and 27 having a pintle or axis member 41 held in position by a screw 42 and journalled in the arm 26. The hub member has an opening therethrough through which the post 15 extends. The post is provided with a slot 18 advantageously only on one side thereof and a clamping member 44 is positioned within the post. A knob 46 has an extending screw threaded member 47 which is rotatable in the arm 27. The member 47 extends rotatably into the hub coaxial with the pintle 41 and it engages the internal threads of an aperture 48 in the clamping member 44. A suitable friction washer 50 may be disposed between one end of the hub and the arm 27.

It will be seen by considering Fig. 4 that if the knob 46 is turned in a tightening direction the arm 27 is clamped between the hub 40 and the knob 46. This is accomplished because the clamping member 44 is tightened against the slotted wall of the post so that the post and the hub are clamped together with the hub engaging one side of the arm 27 or the friction washer 50, and the knob engaging the other side. If the knob is turned to loosen the assembly the post may be adjusted lengthwise within the limits of the slot 18 and it also may be rockably adjusted on the common axis of the pintle 41 and member 47. The exposed ends of the hangers are preferably rounded as at 51 to give a finished appearance and to eliminate sharp edges and the lower end of the post is similarly rounded as at 52. This may be done by die operations or by swaging.

In use, the device is assembled and mounted substantially as shown in Fig. 1. The load is carried from the shoulders of a person by the hooks 2 and 6 as the hangers depend therefrom at the front of a person and rest against the person. The multiple adjustment, that is, the adjustment of the bracket on the hangers and the adjustment of the post relative to the bracket provides ample adjustment for accommodating persons of different heights. The angular adjustment of the post 15 around the axis of 41 and 47 is also useful depending upon the desired angular position of the camera although usually the post will probably be in a substantially vertical position. The camera may be turned on the vertical axis of the stud 16. When the device is to be transported or otherwise carried the hangers may be removed from the bracket by loosening the knob 37 and then separated from each other so that they may be compactly carried. The bracket and post 15 may be adjusted so that the bracket and post are in substantial alignment with each other or, if desired, the knob 46 and its screw may be completely removed so that the post and bracket may be completely separated from each other. The parts may be quickly and easily assembled by the reverse action.

I claim:

1. A device for holding an instrument, such as a camera, on the person of the user comprising, two similar hanger members each having a hook portion for engaging over a shoulder of the person and each having a body portion depending from the hook portion, means detachably connecting the lower ends of the hanger members, so that the hanger members may be separated and compacted to be carried about, said hanger members having lower parts disposed substantially parallel with each other when the said lower ends thereof are connected and the hanger members are engaged over the person's shoulders, and each having a bend line dividing the lower parts and the body portions, so that the body portion of each extends angularly from the hook portion to the bend line, a post having means at one end for connection to the instrument to support the same, and means having elements for adjustable mounting on said parallel parts of the hanger members for supporting the post.

2. A device for holding an instrument, such as a camera, on the person of the user comprising, two hanger members each having a hook portion for engaging over a shoulder of the person and each having a body portion depending from the hook portion, means for detachably connecting the lower ends of the hanger members, said hanger members having lower parts disposed substantially parallel with each other when the hangers are depending from the user's shoulders and each having a bend line dividing the lower parts and the body portions, so that the body portion of each extends angularly from the hook portion to the bend line, a bracket, means associated with the bracket for clamping the same to the said parallel parts of the hanger members so that the bracket projects outwardly from the person, a post having means at one end for supporting the instrument, and means at the projecting end of the bracket for slidably receiving and adjustably clamping the post.

3. A device for holding an instrument, such as a camera, on the person of the user comprising, hanger means having hook portions for engaging over the shoulders of the person and having parts depending therefrom adapted to rest against a portion of the person, a bracket, means for securing the bracket to said depending parts so that the bracket is adapted to extend away from the body of the person, a post having means at one end for engaging and supporting the instrument, said bracket having spaced parts, a hub member rockably positioned between the spaced parts and having an aperture therethrough for receiving the post, said post having an elongated slot therein, a clamping member within the post, a second clamping member extending through a part of the bracket and axially into the hub member through the elongated slot and having a threaded engagement with the first named clamping member, said second clamping member serving as an axis for the hub and adapted to be tightened to frictionally engage the post the hub and the bracket, whereby to hold the post in lengthwise adjusted position and to hold the hub in adjusted position on its axis.

4. A device for holding an instrument, such as a camera, on the person of the user comprising, hanger means having hook portions for engaging the shoulders of a person and having parts depending therefrom including portions which are substantially parallel to each other and which extend in an up and down direction when the hanger means is applied to the person as stated, a bracket, means for detachably and adjustably securing the bracket to said parallel parts so that said bracket projects away from the body of the person and can be adjusted in an up and down direction on said parallel portions, a rotatable hub member carried by the bracket adjacent its projecting end, a post slidably mounted in said hub member, clamping means for clamping the post, hub, and bracket together and means at one end of the post for detachably holding the instrument substantially in the line of sight of the user.

5. A device for holding an instrument, such as a camera, on the person of the user comprising, two similar hanger members each having a hook portion for engaging over a shoulder of the person and each having a body portion depending from the hook portion, each hanger member having a lower part separated from its body portion by a bend line, the extreme lower end of each hanger member being laterally disposed relative to its said lower part, means for securing said lower ends together, the said lower parts lying substantially parallel to each other when the hanger members are engaged over the shoulders of a user, a post having means at one end for connection to the instrument to support the same, and means for mounting the post on said parallel parts of the hanger members of the adjustment lengthwise thereof.

KATHRYN B. ANDERSON.

References Cited in the file of this patent

UNITED STATES PATENTS

| Number | Name | Date |
|---|---|---|
| 817,207 | Wheeler | Apr. 10, 1906 |
| 1,018,771 | Neuburger | Feb. 27, 1912 |
| 1,993,485 | Paul | Mar. 5, 1935 |
| 2,481,717 | Blair | Sept. 13, 1949 |
| 2,495,265 | Krogman | Jan. 24, 1950 |